US00RE40190E

(19) United States
(12) Reissued Patent
Takach et al.

(10) Patent Number: US RE40,190 E
(45) Date of Reissued Patent: Apr. 1, 2008

(54) THERMOSTAT HOUSING

(75) Inventors: Eugene J. Takach, Eden Prairie, MN (US); John Wadsworth, Los Angeles, CA (US); John von Buelow, Oak Park, CA (US)

(73) Assignee: Honeywell International Inc., Morristown, NJ (US)

(21) Appl. No.: 29/255,493

(22) Filed: Mar. 8, 2006

Related U.S. Patent Documents

Reissue of:
(64) Patent No.: Des. 509,151
Issued: Sep. 6, 2005
Appl. No.: 29/205,143
Filed: May 10, 2004

(51) LOC (8) Cl. ..... 10-04
(52) U.S. Cl. ..... D10/50
(58) Field of Classification Search ..... D10/49, D10/50; 236/46 R, 47, 49.3, 51, 84, 94; 400/485
See application file for complete search history.

(56) References Cited

U.S. PATENT DOCUMENTS

| | | | |
|---|---|---|---|
| 4,079,366 | A | 3/1978 | Wong |
| 4,174,807 | A | 11/1979 | Smith et al. |
| 4,206,872 | A | 6/1980 | Levine |

(Continued)

FOREIGN PATENT DOCUMENTS

| | | |
|---|---|---|
| WO | WO 01/93779 | 12/2001 |

OTHER PUBLICATIONS

Carrier, "Programmable Dual Fuel Thermostat," Installation, Start–Up & Operating Instructions, pp. 1–12, Oct. 1998.

(Continued)

*Primary Examiner*—Antoine D. Davis

(57) CLAIM

The ornamental design for a thermostat housing, as shown and described.

DESCRIPTION

The present application is related to co-pending U.S. patent application Ser. No. 10/726,201, filed on Dec. 2, 2003, entitled "Controller Interface With Multiple Day Programming", U.S. patent application Ser. No. 10/726,247, filed on Dec. 2, 2003, entitled "Controller Interface With Menu Schedule Override", U.S. patent application Ser. No. 10/726,174, filed on Dec. 2, 2003, entitled "Programmable Controller With Saving Changes Indication", U.S. patent application Ser. No. 10/725,826, filed Dec. 2, 2003, entitled "Controller Interface With Separate Schedule Review Mode", U.S. patent application Ser. No. 10/726,243, filed Dec. 2, 2003, entitled "Controller With Programmable Service Event Display", and U.S. patent application Ser. No. 10/726,245, filed Dec. 2, 2003, entitled Controller Interface with Interview Programming.

FIG. 1 is a perspective view of a thermostat housing;
FIG. 2 is a front elevation view of the thermostat housing of FIG. 1; and,
FIGS. 3-6 are elevation views from the bottom, right, top and left, respectively, of the thermostat housing of FIG. 1.
The broken line portions of the thermostat housing shown in the figures are for illustrative purposes only and form no part of the claimed design.
*The broken line showing of portions of a thermostat housing is included for the purpose of illustrating non-claimed structure and forms no part of the claimed design.*

1 Claim, 6 Drawing Sheets

Figure 3:
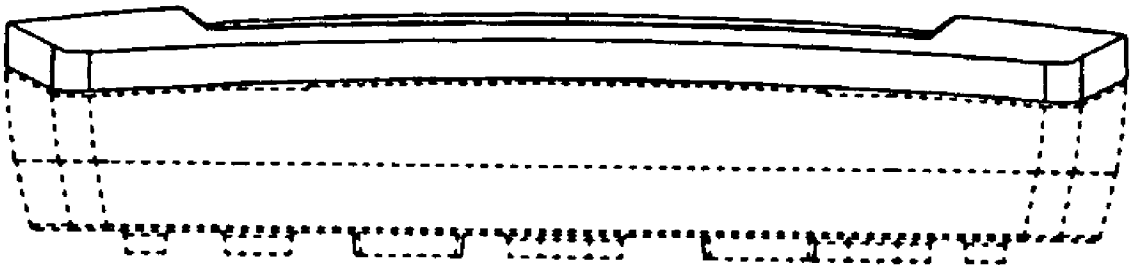

Matter enclosed in heavy brackets [ ] appears in the original patent but forms no part of this reissue specification; matter printed in italics indicates the additions made by reissue.

(amended)

U.S. PATENT DOCUMENTS

| | | | | |
|---|---|---|---|---|
| 4,264,034 | A | | 4/1981 | Hyltin et al. |
| 4,298,946 | A | | 11/1981 | Hartsell et al. |
| 4,308,991 | A | | 1/1982 | Peinetti et al. |
| 4,337,822 | A | | 7/1982 | Hyltin et al. |
| 4,382,544 | A | | 5/1983 | Stewart |
| 4,386,649 | A | | 6/1983 | Hines et al. |
| 4,388,692 | A | | 6/1983 | Jones et al. |
| 4,431,134 | A | | 2/1984 | Hendricks et al. |
| 4,442,972 | A | | 4/1984 | Sahay et al. |
| 4,446,913 | A | | 5/1984 | Krocker |
| 4,479,604 | A | | 10/1984 | Didner |
| 4,606,401 | A | | 8/1986 | Levine et al. |
| 4,621,336 | A | | 11/1986 | Brown |
| 4,717,333 | A | | 1/1988 | Carignan |
| 4,725,001 | A | | 2/1988 | Carney et al. |
| 4,837,731 | A | | 6/1989 | Levine et al. |
| 4,881,686 | A | | 11/1989 | Mehta |
| 4,918,439 | A | | 4/1990 | Wozniak et al. |
| 4,948,040 | A | | 8/1990 | Kobayashi et al. |
| 4,992,779 | A | | 2/1991 | Sugino et al. |
| 4,997,029 | A | | 3/1991 | Otsuka et al. |
| 5,012,973 | A | | 5/1991 | Dick et al. |
| 5,038,851 | A | | 8/1991 | Metha |
| 5,065,813 | A | | 11/1991 | Berkeley et al. |
| 5,088,645 | A | | 2/1992 | Bell |
| 5,161,606 | A | | 11/1992 | Berkeley et al. |
| 5,181,653 | A | | 1/1993 | Foster et al. |
| 5,230,482 | A | | 7/1993 | Ratz et al. |
| 5,259,445 | A | | 11/1993 | Pratt et al. |
| 5,329,991 | A | | 7/1994 | Metha et al. |
| 5,348,078 | A | | 9/1994 | Dushane et al. |
| D361,287 | S | * | 8/1995 | Guy et al. ..... D10/50 |
| 5,482,209 | A | | 1/1996 | Cochran et al. |
| D367,430 | S | * | 2/1996 | Greenberg et al. ..... D10/49 |
| 5,526,422 | A | | 6/1996 | Keen |
| 5,537,106 | A | | 7/1996 | Mitcuhashi |
| 5,566,879 | A | | 10/1996 | Longtin |
| 5,570,837 | A | | 11/1996 | Brown et al. |
| 5,673,850 | A | | 10/1997 | Uptegraph |
| 5,782,296 | A | | 7/1998 | Metha |
| 5,873,519 | A | | 2/1999 | Beilfuss |
| 5,902,183 | A | | 5/1999 | D' Souza |
| 5,937,942 | A | | 8/1999 | Bias et al. |
| 6,032,867 | A | | 3/2000 | Dushane et al. |
| 6,196,467 | B1 | | 3/2001 | Dushane et al. |
| 6,208,331 | B1 | | 3/2001 | Singh et al. |
| 6,315,211 | B1 | | 11/2001 | Sartain et al. |
| 6,318,639 | B1 | | 11/2001 | Toth |
| 6,351,693 | B1 | | 2/2002 | Monie et al. |
| 6,502,758 | B2 | | 1/2003 | Cottrell |
| 6,513,723 | B1 | * | 2/2003 | Mueller et al. ..... 236/46 R |
| 6,518,957 | B1 | | 2/2003 | Lehtinen et al. |
| 6,581,846 | B1 | | 6/2003 | Rosen |
| 6,595,430 | B1 | | 7/2003 | Shah |
| 2002/0005435 | A1 | | 1/2002 | Cottrell |
| 2003/0034897 | A1 | | 2/2003 | Shamoon et al. |
| 2003/0034898 | A1 | | 2/2003 | Shamoon et al. |
| 2003/0121652 | A1 | | 7/2003 | Carey et al. |
| 2003/0142121 | A1 | | 7/2003 | Rosen |
| 2006/0192022 | A1 | * | 8/2006 | Barton et al. ..... 236/94 |
| 2006/0283965 | A1 | * | 12/2006 | Mueller et al. ..... 236/51 |

OTHER PUBLICATIONS

Carrier, "Programmable Thermostats," Installation, Start–Up & Operating Instructions, pp. 1–16, Sep. 1998.

Carrier, "Standard Programmable Thermostat," Homeowner's Manual, pp. 1–8 pages, 1998.

Carrier, "Thermidistat Control, Installation, Start–Up, and Operating Instructions," pp. 1–12, Aug. 1999.

CorAccess, "Companion 6," User Guide, pp. 1–20, Jun. 17, 2002.

http://www.thermostatsales.com, Robertshaw, "9610 Digital Programmable Thermostat," 3 pages, printed Jun. 17, 2004.

http://www.thermostatsales.com, Robertshaw, "9700 Deluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.

http://www.thermostatsales.com, Robertshaw, "9720 Deluxe Programmable Thermostat," 3 pages, printed Jun. 17, 2004.

Hunter, "44200/44250," Owner's Manual, 32 pages, printed prior to filing date.

Hunter, "44300/44350," Owner's Manual, 35 pages, printed prior to filing date.

Hunter, "Auto Saver 550", Owner's Manual Model 44550, 44 pages, printed prior to filing date.

Invensys™, "9700i 9701i 9715i 9720i Deluxe Programmable Thermostats," User's Manual, pp. 1–28, printed prior to filing date.

Lux, "511 Series Smart Temp Electronic Thermostat," Owner's Manual, 3 pages, printed prior to filing date.

Lux, "600 Series Smart Temp Electronic Thermostat," Owner's Manual, 3 pages, printed prior to filing date.

Lux, "602 Series Multi–Stage Programmable Thermostat," Owner's Manual, 2 pages, printed prior to filing date.

Lux, "605/2110 Series Programmable Heat Pump Thermostat," Owner's Manual, 3 pages, printed prior to filing date.

Lux, "700/9000 Series Smart Temp Electronic Thermostat," Owner's Manual, 3 pages, printed prior to filing date.

Lux, "PSPH521 Series Programmable Heat Pump Thermostat," Owner's Manual, 3 pages, printed prior to filing date.

Lux, "TX1500 Series Smart Temp Electronic Thermostat," Owner's Manual, 6 pages, printed prior to filing date.

Lux, "TX500 Series Smart Temp Electronic Thermostat," Owner's Manual, 3 pages, printed prior to filing date.

Lux, "ELV1 Programmable Line Voltage Thermostat," Owner's Manual, 3 pages, printed prior to filing date.

Metasys, "HVAC Pro for Windows User's Manual," 308 pages, 1998.

http://www.ritetemp.info/rtMenu_13.html, Rite Temp 8082, 8 pages , printed Jun. 20, 2003.

Totaline, "1 For All programmable Digital Thermostat," Owner's Manual P/N P374–1100FM, 23 pages, Nov. 1998.

Totaline, "1 For All Programmable Digital Thermostat," Owner's Manual P/N P474–1050, 21 pages, Nov. 1998.

Totaline, "1 For All Programmable Digital Thermostat," Owner's Manual P/N P374–1100, 24 pages, Apr. 2001.

Totaline, "Intellistat Combination Temperature and Humidity Control," Owner's Manual P/N P374–1600, 25 pages, Jun. 2001.

Totaline, "Programmable Thermostat Configurable for Advanced Heat Pump or Dual Fuel Operation," Owner's Manual P/N P374–1500, 24 pages, Jun. 1999.

Totaline, "Instructions P/N P474–1010", Manual, 2 pages, Dec. 1998.

Totaline, "Programmable Thermostat", Homeowner's Guide, 27 pages, Dec. 1998.

Totaline, "Wireless Programmable Digital Thermostat," Owner's Manual 474–1100RF, 21 pages, 2000.

Warmly Yours, "Model TH111GFCI–P (120 VAC)," Manual, pp. 1–4, printed prior to filing date.

White–Rodgers, "Installation Instructions for Heating & Air Conditioning IF72 5/2 Day Programmable Heat Pump Thermostat," 8 pages, printed prior to filing date.
White–Rodgers, "Installation Instructions for Heating & Air Conditioning IF78 5/2 Day Programmable Thermostat," 7 pages, printed prior to filing date.
White–Rodgers, "Comfort–Set 90 Series Thermostat," Manual, pp. 1–24, printed prior to filing date.
White–Rodgers, "Comfort–Set III Thermostat," Manual, pp. 1–44, printed prior to filing date.
White–Rodgers, 1F80–240 "(for Heating Only systems) Programmable Electronic Digital Thermostat," Installation and Operation Instructions, 8 pages, printed prior to filing date.
White–Rodgers, 1F80–241 "Programmable Electronic Digital Thermostat," Installation and Operation Instructions, 6 pages, printed prior to filing date.
White–Rodgers, 1F80–261 "Programmable Electronic Digital Thermostat," Installation and Operation Instructions, 8 pages, printed prior to filing date.
White–Rodgers, 1F81–261 "Programmable Electronic Digital Multi–Stage Thermostat," Installation and Operation Instructions, 8 pages, printed prior to filing date.
White–Rodgers, 1F82–261 "Programmable Electronic Digital Heat Pump Thermostat," Installation and Operation Instructions, 8 pages, printed prior to filing date.

www.icmcontrols.com, Simplecomfort, SC3000 Single Stage Heat/Single Stage Cool or Single Stage Heat Pump/Manual Changeover, 1 page, printed prior to filing date.

www.icmcontrols.com, Simplecomfort, SC3001 Single Stage Heat/Single Stage Cool or Single Stage Heat Pump/Manual Changeover, 1 page, printed prior to filing date.

www.icmcontrols.com, Simplecomfort, SC3006 Single Stage Heat/Single Stage Cool or Single Stage Heat Pump/Manual Changeover, 1 page, printed prior to filing date.

www.icmcontrols.com, Simplecomfort, SC3201 2 Stage Heat Pump Manual Changeover, 1 page, printed prior to filing date.

www.icmcontrols.com, Simplecomfort, SC3801 2 Stage Heat/2 Stage Cool 2 Stage Heat Pump/Audio Changeover, 1 page, printed prior to filing date.

* cited by examiner

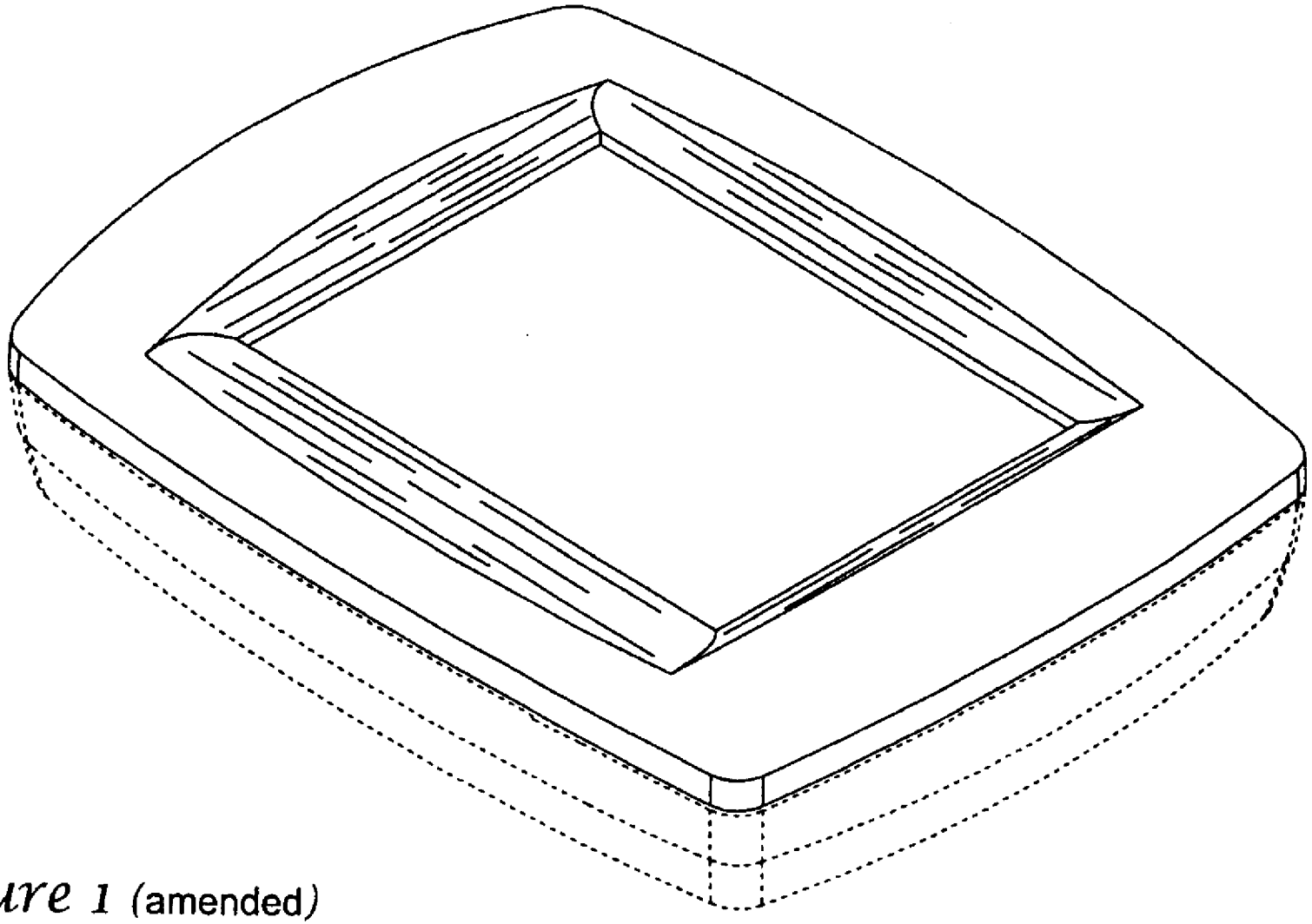
*Figure 1* (amended)

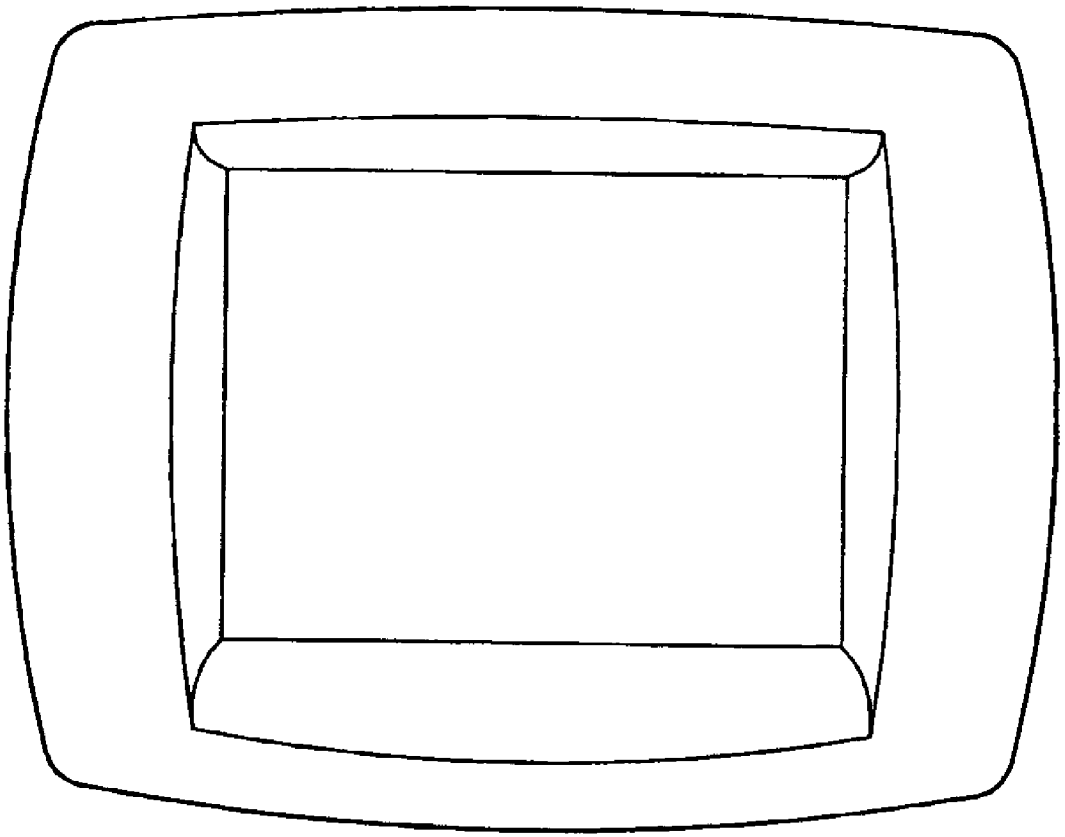
Figure 2 (amended)

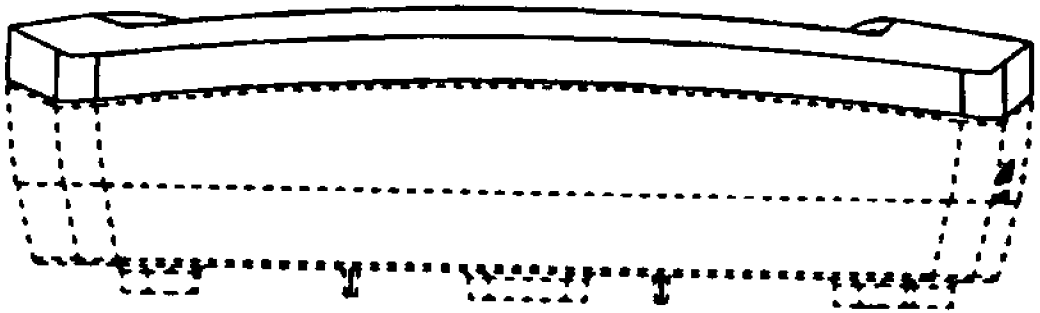
Figure 4 (amended)

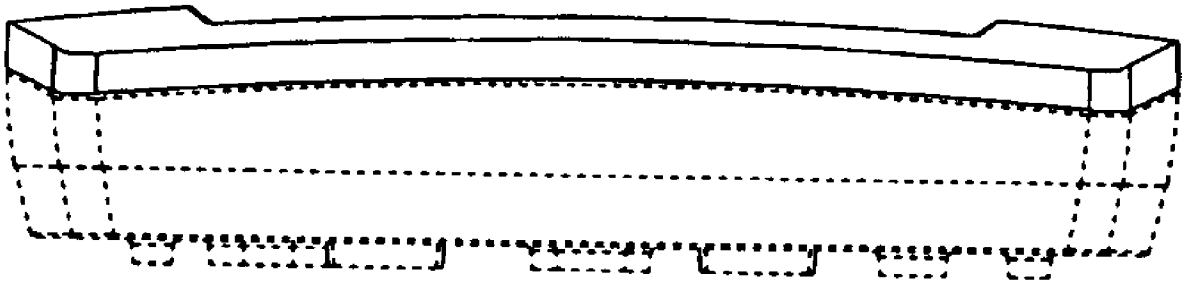
*Figure 5* (amended)

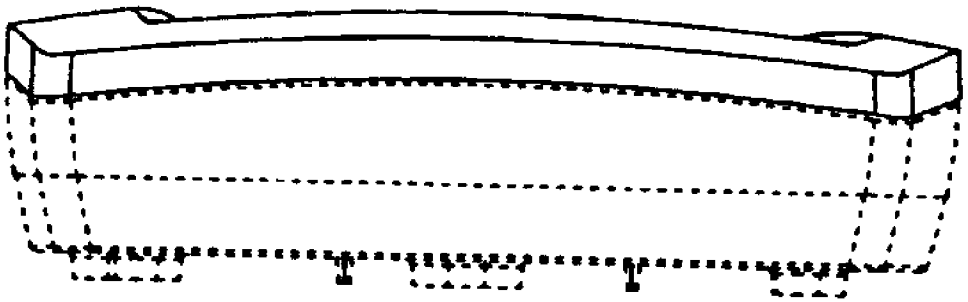
Figure 6 (amended)